(12) United States Patent
Forsström

(10) Patent No.: US 9,334,889 B2
(45) Date of Patent: May 10, 2016

(54) METHOD OF ARRANGING MOUNTING DEVICES ON WELDABLE POLYMERS AND SUITABLE STRAP PARTS

(75) Inventor: Ronny Forsström, Lysekil (SE)

(73) Assignee: FORSSTROM HIGH FREQUENCY AB, Lysekil (SE)

( * ) Notice: Subject to any disclaimer, the term of this patent is extended or adjusted under 35 U.S.C. 154(b) by 107 days.

(21) Appl. No.: 13/997,143

(22) PCT Filed: Dec. 20, 2011

(86) PCT No.: PCT/SE2011/051547
§ 371 (c)(1),
(2), (4) Date: Sep. 16, 2013

(87) PCT Pub. No.: WO2012/096613
PCT Pub. Date: Jul. 19, 2012

(65) Prior Publication Data
US 2014/0000198 A1    Jan. 2, 2014

(30) Foreign Application Priority Data

Dec. 22, 2010  (SE) ...................................... 1001216

(51) Int. Cl.
*B29C 65/08*  (2006.01)
*F16B 5/08*   (2006.01)
(Continued)

(52) U.S. Cl.
CPC . *F16B 5/08* (2013.01); *B29C 65/04* (2013.01); *B29C 65/08* (2013.01);
(Continued)

(58) Field of Classification Search
CPC .... B29C 65/08; B29C 65/04; B29C 65/4815; B29C 66/4722; B29C 66/43; B29C 66/8145; B29C 66/1122; B29C 66/81262; F16B 5/08; E04B 1/54
See application file for complete search history.

(56) References Cited

U.S. PATENT DOCUMENTS 1,562,190 A * 11/1925 Reiter .............................. 24/671
3,107,190 A   10/1963 Kevelin
(Continued)

FOREIGN PATENT DOCUMENTS

EP    0492789 A1   7/1992
EP    0875362 A2   11/1998
(Continued)

OTHER PUBLICATIONS

International Search Report received for PCT Patent Application No. PCT/SE2011/051547 mailed on Mar. 30, 2012, 4 pages.
(Continued)

*Primary Examiner* — Daniel McNally
(74) *Attorney, Agent, or Firm* — Morrison & Foerster LLP

(57) ABSTRACT

A method of providing, by high-frequency welding of at least two construction parts (4,4') containing polymer material weldable by high-frequency welding to an assembled large unit in which said construction parts are comprised, fastener means (1) on said unit, said fastener means being intended for anchoring and building up said unit. The fastener means (1) are made of an electrically conductive material, and a primer layer (2) is arranged on a surface of the fastener means (1) and is bonded by means of a first hardening. A material weldable by high-frequency welding is arranged on top of said primer layer and is bonded thereto by means of a second hardening for building up a connecting layer (3). The invention also relates to anchoring parts (5) for use for that purpose.

11 Claims, 3 Drawing Sheets

(51) Int. Cl.
  *B29C 65/00* (2006.01)
  *B29C 65/04* (2006.01)
  *E04B 1/61* (2006.01)
  *B29L 7/00* (2006.01)
  *B29C 65/50* (2006.01)
  *B29C 65/48* (2006.01)

(52) U.S. Cl.
  CPC ............ *B29C 66/1122* (2013.01); *B29C 66/43* (2013.01); *B29C 66/474* (2013.01); *B29C 66/4722* (2013.01); *B29C 66/72321* (2013.01); *B29C 66/73143* (2013.01); *B29C 66/8145* (2013.01); *B29C 66/81262* (2013.01); *E04B 1/54* (2013.01); *B29C 65/4815* (2013.01); *B29C 65/5021* (2013.01); *B29C 65/5042* (2013.01); *B29C 66/71* (2013.01); *B29C 66/729* (2013.01); *B29C 66/7212* (2013.01); *B29C 66/832* (2013.01); *B29L 2007/005* (2013.01)

(56) References Cited

U.S. PATENT DOCUMENTS

| | | | |
|---|---|---|---|
| 3,528,867 A | | 9/1970 | Leatherman et al. |
| 4,251,310 A | | 2/1981 | Goldhaber et al. |
| 5,657,516 A | * | 8/1997 | Berg et al. ................. 24/452 |
| 2008/0295947 A1 | * | 12/2008 | Bourbeau et al. ............ 156/73.1 |

FOREIGN PATENT DOCUMENTS

| | | | | |
|---|---|---|---|---|
| EP | 2050872 A1 | | 4/2009 | |
| IT | EP 2050872 A1 | * | 4/2009 | ............ B32B 15/082 |

OTHER PUBLICATIONS

Extended European Search Report (includes Supplementary European Search Report and Search Opinion) received for European Patent Application No. 11855526.7, mailed on May 26, 2015, 5 pages.

International Preliminary Report on Patentability received for PCT Patent Application No. PCT/SE2011/051547, mailed on Jul. 4, 2013, 6 pages.

International Written Opinion received for PCT Patent Application No. PCT/SE2011/051547, mailed on Mar. 30, 2012, 4 pages.

* cited by examiner

METHOD OF ARRANGING MOUNTING DEVICES ON WELDABLE POLYMERS AND SUITABLE STRAP PARTS

CROSS REFERENCE TO RELATED APPLICATIONS

This application is a U.S. National Phase patent application of PCT/SE2011/051547, filed on Dec. 20, 2011, which claims priority to Swedish Patent Application No. 1001216-9, filed on Dec. 22, 2010, each of which is hereby incorporated by reference in the present disclosure in its entirety.

TECHNICAL FIELD

The present invention relates to a method of providing, by high-frequency welding of at least two construction parts containing polymer material weldable by high-frequency welding to an assembled large unit in which said construction parts are comprised, fastener means on said unit, said fastener means being intended for anchoring and building up said unit.

The invention also relates to anchoring parts for that purpose.

BACKGROUND

A variety of different end products are manufactured in the above-mentioned way. Examples of end products include truck tarps, boat tarps, tarpaulins, tents, doors, fabric ceilings, inflatable products, liquid tanks, advertising signboards, sun shading, projection screens, sports facilities, storage facilities, tribune roofs, oil containment booms, valve drums, life-saving equipment, rescue stretchers, water beds, bathing pools, etc.

High-frequency welding of polymer material is a well-known method that has been used since the 1940ies and has now been greatly developed and refined in terms of control processes, material combinations and design of process tools, such as electrodes. By means of state-of-the art process methods it is possible to obtain even, leak-proof and durable welding seams for even the widest variety of uses, such as the ones mentioned above.

In principle, high-frequency welding of two layers of polymer material is performed such that both materials are, in an overlapping welding area, pressed together between two welding electrodes or between a welding electrode and a ground plane and are exposed to a high-frequency electromagnetic field, usually 27.12 MHz. The combination of the heat generated and pressure brings about a welding seam. Four important factors that influence the final welding result are compression pressure, welding effect, welding time, and cooling time. Those parameters may be adjusted and combined in various ways to arrive at an optimal welding result for a specific material or a specific material combination.

Usually high-frequency welding is used for joining of polyvinyl chloride (PVC) and polyurethane (PU).

Obviously, it is important in the context of many of the end products listed above that they are leak-proof.

It is a substantial problem in the manufacture of said end products that, in addition to being joined, the constituent construction parts are also to be anchored in the bearing structures, and that it has so far been very difficult, cumbersome, and time-consuming to locate fastener means by way of high-frequency welding of weldable polymer material, while simultaneously applying the fastener means such that the structure becomes leak-proof. Examples of hitherto known methods of anchoring combined construction parts in bearing structures include tailored pockets on the construction parts, said pockets being intended for the introduction of carrier lists that are subsequently coupled to bearing structures. The difficulty of anchoring, in a simple and in all respects satisfactory manner, combined construction parts in bearing structures has lead to the end products becoming complex and expensive to manufacture and assemble.

For a long time there has been a very great need, in the building up of end products of the above-mentioned kind, for simplified solutions for the anchoring to bearing structures by means of units joined by high-frequency welding.

There is also a need for making manufacturing and mounting processes more efficient, eg within car manufacturing or within the building industry, to reduce the time consumption involved in the mounting and/or manufacturing processes.

BRIEF DESCRIPTION OF THE INVENTION

The present invention provides a solution to the above-referenced problem.

According to the invention, the method described in the introductory part for anchoring fastener means is characterised in that the fastener means are made of an electrically conductive material; that a primer layer is arranged on a surface of the fastener means and is bonded by means of a first hardening; that a material weldable by high-frequency welding is arranged on top of said primer layer and is bonded thereto by means of a second hardening for building up a connecting layer.

According to an embodiment, the invention is characterised in that the fastener means are applied in intended positions on the construction parts with the connecting layer on the respective fastener means in direct abutment on the construction parts and connected thereto by high-frequency welding; in that, by the construction of the intended unit, adjoining construction parts in that unit are arranged with overlapping portions; and that said construction parts are joined in said overlapping portions by high-frequency welding.

According to an embodiment, the invention is further characterised in that said weldable material for the connecting layer is selected from among polyvinyl chloride (PVC), polyurethane (PU), or from among said plastics strengthened with reinforcements, eg a glass-fibre reinforcement.

According to an embodiment, the invention is characterised in that fastener means suitable for the intended final application are selected from among a range of pre-manufactured fastener means, all of which are provided with said connecting layer and with said intermediate primer layer.

According to an embodiment, the invention is characterised in that fastener means from said range are used as electrodes in the anchoring through high-frequency welding of the fastener means in question in intended positions on the construction parts.

According to an embodiment, the invention is further characterised in that a fastener means is arranged on at least one of two construction parts arranged adjoiningly in the unit and covering said overlapping portions; and in that said fastener means is used as an electrode in the high-frequency welding.

According to an embodiment, the invention is further characterised in selecting, as said electrically conducting material, eg aluminium, stainless steel, copper, or brass.

According to an embodiment, the invention is further characterised in that said primer layer is provided in the form of a thin layer of a magnitude of 1-25 µm on the fastener means.

According to an embodiment, the invention is characterised by said connecting layer being provided through coating of polyvinyl chloride (PVC) or polyurethane (PU) with or without reinforcement on said primer layer.

According to an alternative embodiment, the invention is characterised in that said coating is applied in a layer of a thickness within the range of 25-750 μm.

According to an embodiment, the invention is characterised in that construction parts forming part of a unit are configured to be connected securely to a fastener means and to an associated connecting layer on a free surface; and that the construction parts are joined to a large unit through said connecting layer on a construction part being arranged directly against the connecting layer on an adjoining construction part, following which the mutually adjoining connecting layers are joined by high-frequency welding.

According to the invention, an anchoring part for use in the construction and/or assembly of a construction is characterised by fastener means in the form of an electrically conductive material; a primer layer arranged on a surface of the fastener means and bonded thereto through a first hardening; and a connecting layer of a polymer material weldable by high-frequency welding, said connecting layer being coated on top of said primer layer and connected thereto by a second hardening.

According to an embodiment, the invention is further characterised in that anchoring parts are made in a product range comprising different geometrical shapes and sizes.

According to an embodiment of said anchoring part, the invention is characterised in that said electrically conductive material is constituted by eg aluminium, stainless steel, copper, or brass.

According to an embodiment of said anchoring part, the invention is characterised in that said electrically conductive material is configured to contain the male part or the female part of a screw joint.

According to an embodiment of said anchoring part, the invention is characterised in that a coupling means, such as a fastener ring or brace, is secured by welding to the fastener means.

DESCRIPTION OF THE INVENTION

In the following, the invention will be described in further detail with reference to the accompanying drawings, wherein.

DESCRIPTION OF EMBODIMENTS

Figure 1:
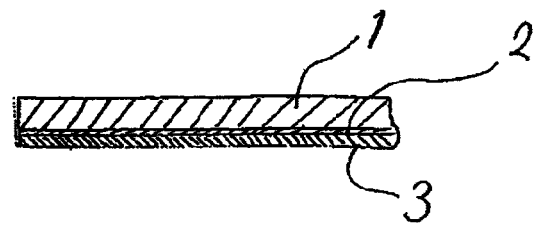
FIG. 1 is a schematic view showing the principles of the method according to the invention.

In FIG. 1, reference numeral 1 is used to designate a fastener means of an electrically conductive material, eg of aluminium or stainless steel. On the one side of the fastener means, a primer layer 2 is arranged which is bonded to the fastener means 1 through a first hardening. A material which is weldable by high-frequency welding is arranged on top of the primer layer and is bonded thereto by means of a second hardening for building up a connecting layer 3. That connecting layer which is weldable by high-frequency welding is constituted by a material which is selected from among polyvinyl chloride (PVC), polyurethane (PU), or from among said plastics strengthened by reinforcements, conveniently a glass fibre reinforcement. Said connecting layer is conveniently provided through coating of the primer layer 2 with a layer of polyvinyl chloride or polyurethane with or without reinforcement, which layer is bonded to the primer layer through a second hardening.

Figure 2:
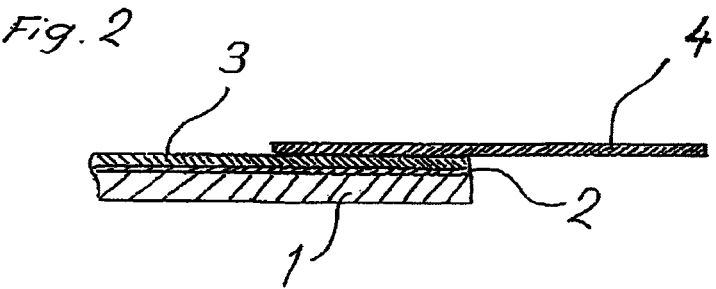
FIG. 2 is a schematic view showing an embodiment of the method according to the invention.

In FIG. 2, reference numeral 4 is used to designate a construction part of a material which is weldable by high-frequency welding. FIG. 2 shows an element according to according to FIG. 1 connected to the construction part 4. The prerequisite for that connection to take place by high-frequency welding is that the same type of polymer partakes in both the connecting layer 3 and the construction part 4, ie if the connecting layer is constituted by polyurethane, optionally strengthened with reinforcement, the construction part must consequently consist of polyurethane.

Figure 3:
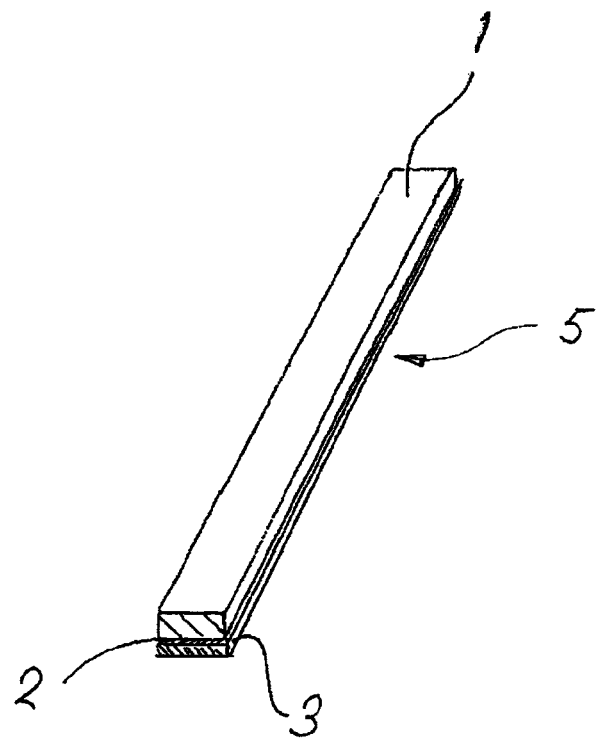
FIG. 3 is a schematic view of an exemplary anchoring part according to the invention.

FIG. 3 shows an example of an anchoring part according to the invention. The anchoring part as a whole is designated by 5. In FIG. 3, components partaking in the anchoring part 5 are designated by the same references as corresponding parts in FIGS. 1 and 2.

Figure 4:
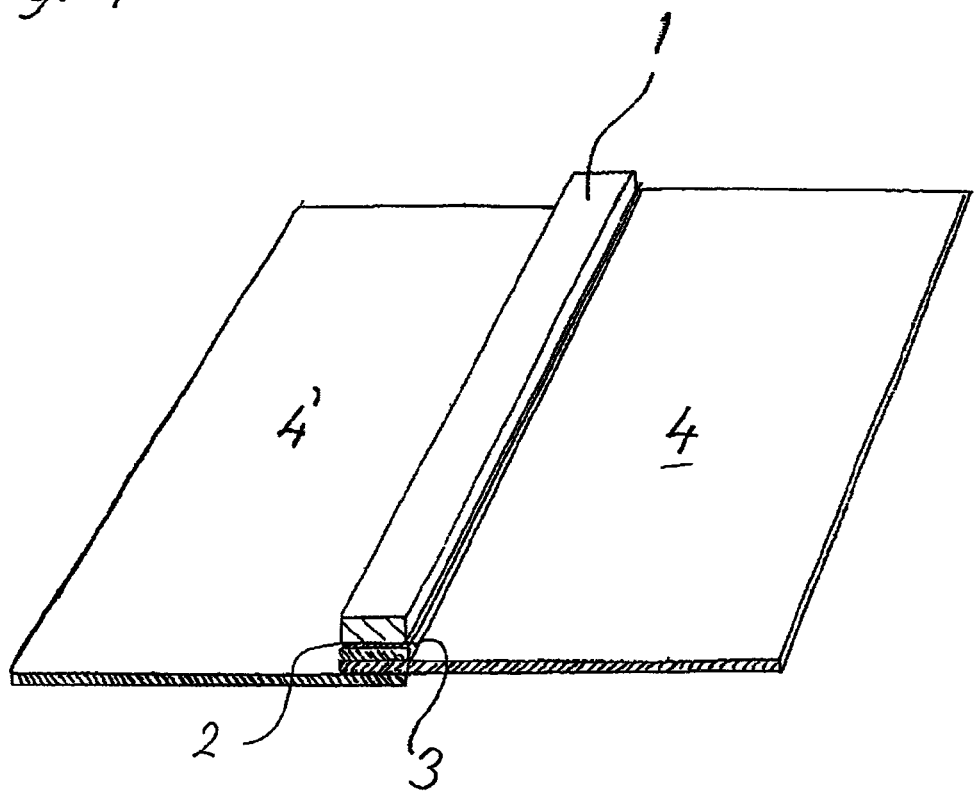
FIG. 4 shows an example of how an anchoring part can be used for the connection of construction parts.

FIG. 4 shows an anchoring part 5 according to FIG. 3 arranged on a construction part 4 in the form of a cloth or a film of a material which is polymeric and weldable by high-frequency welding. The material can be polyvinyl chloride (PVC) or polyurethane (PU). As will appear from FIG. 4, two construction parts 4 and 4' are arranged on top of each other with overlapping edge portions. In the exemplary embodiment shown in FIG. 4, the anchoring part 5 is configured so as to cover said overlapping portions. By welding of said edge portions to one another, the fastener element 1 on the anchoring part can be used as the one electrode when the edge portions are joined by high-frequency welding.

Obviously, the fastener means 1 of a construction according to FIG. 4 also serves as a reinforcement of the end product and as a reinforcement of the welding seam built by the high-frequency welding.

Figure 5:
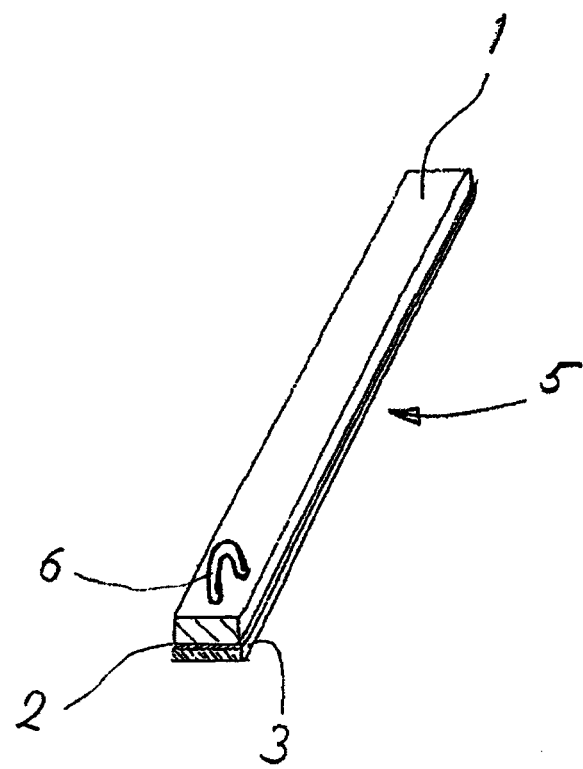
FIG. 5 shows an anchoring part in accordance with a somewhat modified embodiment.

FIG. 5 shows an embodiment which has been somewhat modified relative to the embodiment shown in FIG. 3. In FIG. 5, a coupling means has been arranged on the anchoring part 5 in the form of a brace 6 which is welded onto the fastener means 1.

The anchoring parts shown in FIGS. 3 and 5 have been exemplified as featuring an elongate simple shape. In accordance with the invention anchoring parts may be manufactured in a wide range that comprises various geometrical shapes and sizes. Anchoring parts according to the invention are simple to manufacture, irrespective of shape and size. The range can be widened as needed. The fastener means 1 of aluminium or stainless steel may be made in any shape, eg curved, and may subsequently be coated with a primer layer with subsequent coating with a material which is weldable by high-frequency welding.

The primer layer 2 is arranged in a thin layer of a magnitude of 1-25 μm and bonded to the fastener element by means of a first hardening.

The connecting layer 3 of a polymer material weldable by high-frequency welding is coated onto the hardened primer layer 2 in a layer thickness of a magnitude within the range of 25-750 μm and is connected to the primer layer through a second hardening.

A system with a range of different anchoring parts will be very flexible in the manufacture and/or construction of various end products, such as truck tarps, boat tarps, tarpaulins, tents, doors, fabric ceilings, inflatable products, liquid tanks, advertising signboards, sun shading, projection screens, sports facilities, storage facilities, tribune roofs, oil containment booms, valve drums, lifesaving equipment, rescue stretchers, water beds, bathing pools, etc.

The anchoring parts are easy to store and do not adhere until they are activated by high-frequency welding. The connection between the anchoring parts and material weldable by high-frequency welding which forms part of the construction parts can be made very strong.

Figure 6:
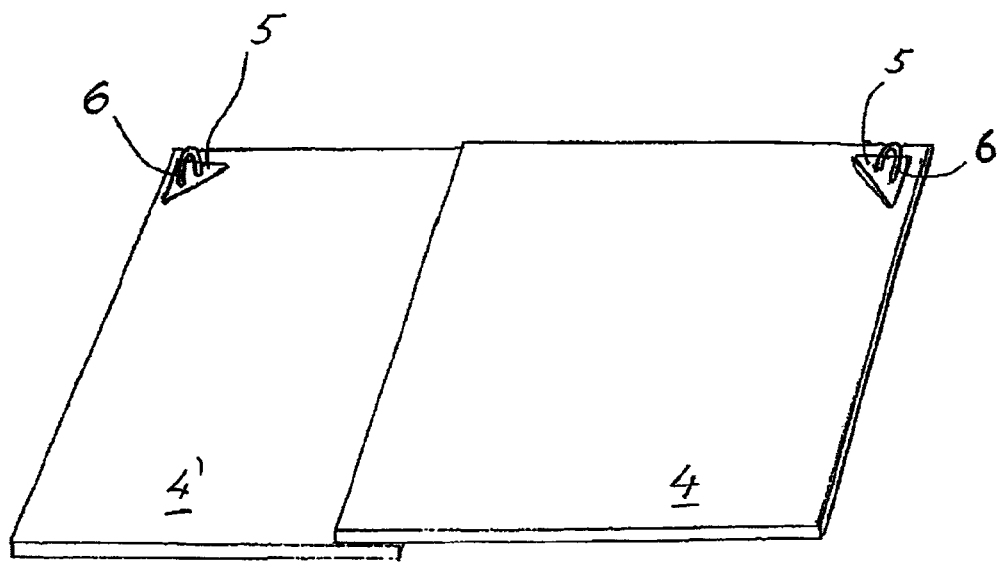
FIG. 6 is a schematic view of a further embodiment of anchoring parts mounted on construction parts.

FIG. 6 illustrates, in one example of an embodiment, how anchoring parts 5 can be connected to construction parts 4,4' forming part of an end product. The construction parts 4,4' consist of a polymer material which is weldable by high-frequency welding, eg cloths of PU or PVC. The construction parts 4,4' are joined by welding through high-frequency welding in the overlapping edge portions. At a corner of respective construction parts 4,4', anchoring parts 5 are fastened, which are provided with fastener braces 6 for connection to bearing parts in the end product.

Figure 7:
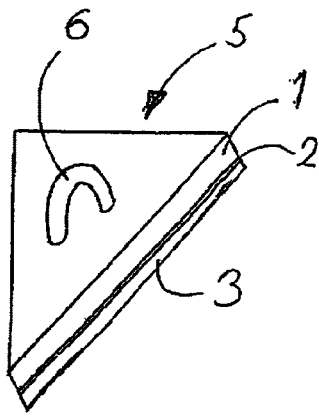
FIG. 7 shows, in larger scale, an anchoring part of the kind shown in FIG. 6.

FIG. 7 shows, in larger scale, the anchoring parts 5 forming part of the embodiment according to FIG. 6. The anchoring parts 5 consist of fastener means 1 of an electrically conductive material, a primer layer 2 applied on a surface of the fastener means and bonded thereto through a first hardening, and a connecting layer 3 of a polymer material weldable by high-frequency welding, said connecting layer being coated on top of said primer layer 2 and connected thereto by means of a second hardening. Fastener braces 6 of the same material as that of the fastener means 1 are welded, in a conventional manner, to the fastener means.

FIGS. 5 through 7 show coupling means in the form of a brace 6. Obviously, other types of coupling means can be connected to the fastener means 1.

For instance, the one half of a screw joint can be welded directly onto a fastener element 1, following which the fastener element can quite simply be arranged by means of the other half of the screw joint in bearing parts. Another example is a fastener ring or the like which is welded directly onto a fastener element.

The electrically conductive fastener means may serve as electrodes in relation to the high-frequency welding. By using fastener elements as electrodes, substantial simplifications can be obtained in the manufacture of end products compared to the assembly methods used so far. For instance, an electrically conductive fastener element of any geometrical shape and suitable to the shape of the end product can be used as electrodes in high-frequency welding, which, in many cases, will considerably simplify the manufacture of the end product.

A considerable advantage obtained by the method according to the invention is that bearing parts of the end products can be connected directly to the fastener elements.

As will appear from the above, a fastener element may serve as the one electrode in high-frequency welding. Alternatively, the fastener element may serve as both electrodes in high-frequency welding.

The above-referenced construction parts may be made of polymer films of polyurethane or polyvinyl chloride. Depending on selected material, film thickness and electrode size and shape, a person skilled in the art is enabled to readily select suitable welding effect and suitable welding times and cooling times for obtaining strong and leak-proof welding seams.

In a corresponding manner, the person skilled in the art selects suitable welding effect and suitable welding times and cooling times for welding together, by high-frequency welding, anchoring parts on construction parts of a polymer material weldable by high-frequency welding.

By the method according to the invention considerable improvements are obtained, compared to prior art methods, in respect of manufacturing time and manufacturing costs for production parts forming part of the end products and also considerable time savings in the context of mounting of the end products.

Figure 8:
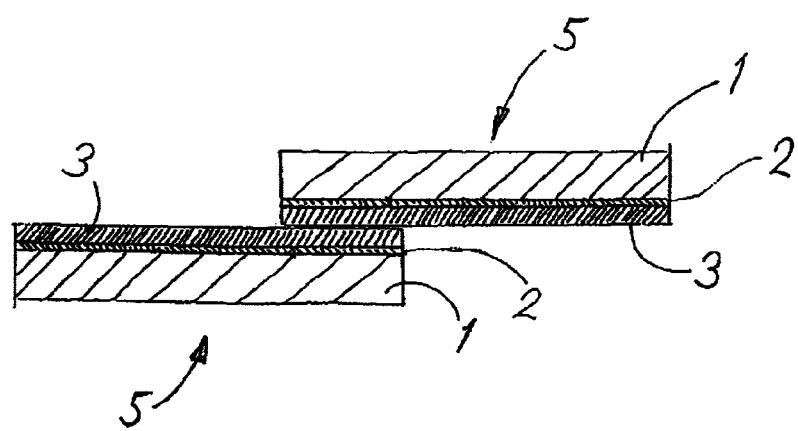
FIG. 8 is a schematic view of the principles of how two anchoring parts can be connected.

FIG. 8 schematically shows how anchoring parts according to the invention can be used for building up or assembling structures and components. FIG. 8 shows how two anchoring parts can be connected to each other by the connecting layer being arranged in direct abutment on each other and welded to each other by high-frequency welding. In this manner very strong connections are obtained.

The method is useful eg within the car manufacturing industry or within the building sector for making the assembly of cars or building components, respectively, more efficient. The fastener element 1 on a first anchoring part 5 is connected to a first component, eg by means of a screw joint or conventional welding connection, and a second component which is to be joined with the first component is connected in a corresponding manner to another anchoring part, following which both components can be joined through high-frequency welding as is shown in a schematic view in FIG. 8. The components that can be interconnected in this manner may obviously be of many different kinds, and in FIG. 8 such components are omitted. One example is interconnection of different window components in a building.

The invention is not limited to the embodiments described above; rather a plurality of other embodiments and modifications are possible within the scope of the appended claims.

For instance, the fastener element can be arranged in other positions on the construction element than those shown in FIG. 4 and FIG. 6.

In fact, the invention provides a free choice as to where the fastener elements are to be arranged, which, compared to earlier known manufacturing methods, provides a considerably increased amount of options for varying the structure of the end products and the way in which various products and building constructions are to be mounted.

The above examples of electrically conductive material included aluminium, stainless steel, copper, or brass. However, other electrically conductive materials or material combinations will be possible within the scope of the appended claims.

The invention claimed is:

1. A method of welding, comprising:
   welding at least two construction parts containing a polymer material weldable by high-frequency welding to form an assembled large unit by high-frequency welding, said construction parts comprising a fastener element on said unit, and said fastener element anchoring and building up said unit,
   wherein the fastener element is made of an electrically conductive material,
   a primer layer is arranged on a surface of the fastener element and is bonded by means of a first hardening, and
   a material weldable by high-frequency welding is arranged on top of said primer layer and is bonded thereto by means of a second hardening for building up a connecting layer.

2. A method according to claim 1 wherein the fastener element suitable for the intended final application is selected from among a range of pre-manufactured fastener elements, all of which are provided with said connecting layer and with said intermediate primer layer.

3. A method according to claim 2, wherein the fastener element from said range is used as an electrode in the anchoring through high-frequency welding of the fastener element in question in intended positions on the construction parts.

4. A method according to claim 1, wherein said connecting layer is provided through coating of polyvinyl chloride (PVC) or polyurethane (PU) with or without reinforcement on said primer layer.

5. A method according to claim 4, wherein said coating is applied in a layer of a thickness within the range of 25-750 μm.

6. A method according to claim 1, wherein the fastener element is applied in intended positions on the construction parts with the connecting layer on the respective fastener element in direct abutment on the construction parts and connected thereto by high-frequency welding, and by the construction of the intended unit, adjoining construction parts in that unit are arranged with overlapping portions, and said construction parts are joined in said overlapping portions by high-frequency welding.

7. A method according to claim 1, wherein said weldable material for the connecting layer is selected from among polyvinyl chloride (PVC), polyurethane (PU), or from among said plastics strengthened with reinforcements.

8. A method according to claim 1, wherein the fastener element is arranged on at least one of two construction parts arranged adjoiningly in the unit and covering overlapping portions of the construction parts, and said fastener element is used as an electrode in the high-frequency welding for joining two adjoining construction parts.

9. A method according to claim 1, wherein aluminium, stainless steel, copper, or brass is selected as said electrically conducting material.

10. A method according to claim 1, wherein said primer layer is provided in the form of a thin layer of a magnitude of 1-25 μm on the fastener element.

11. A method according to claim 1, wherein construction parts forming part of a unit are configured to be connected securely to the fastener element and to an associated connecting layer on a free surface, and the construction parts are joined to a large unit through said connecting layer on a construction part being arranged directly against the connecting layer on an adjoining construction part, following which the mutually adjoining connecting layers are joined by high-frequency welding.

* * * * *